Oct. 17, 1939.  W. J. SMITH  2,176,550
BRAKE AND ACCELERATOR CONTROL
Filed Oct. 27, 1937  3 Sheets-Sheet 3

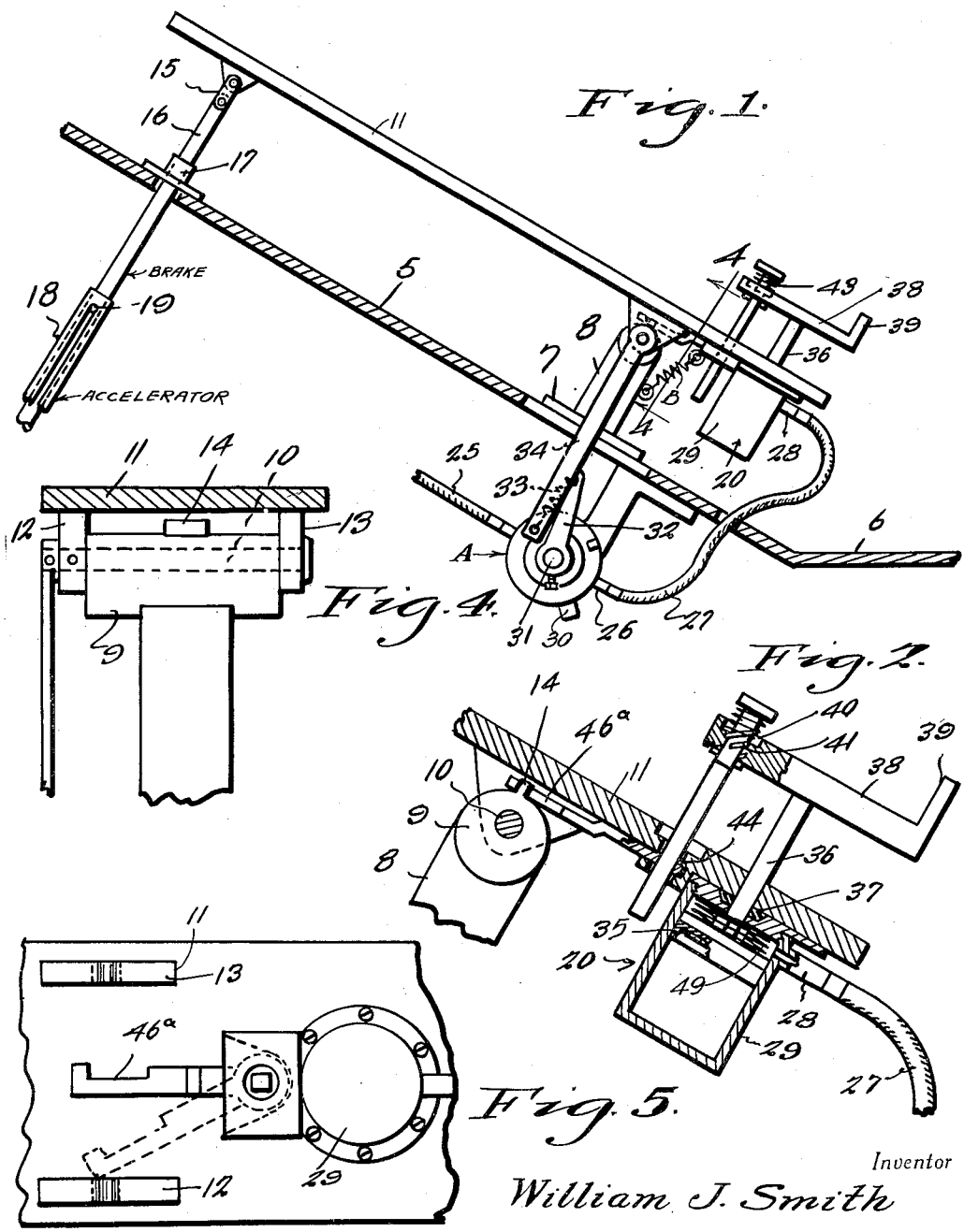

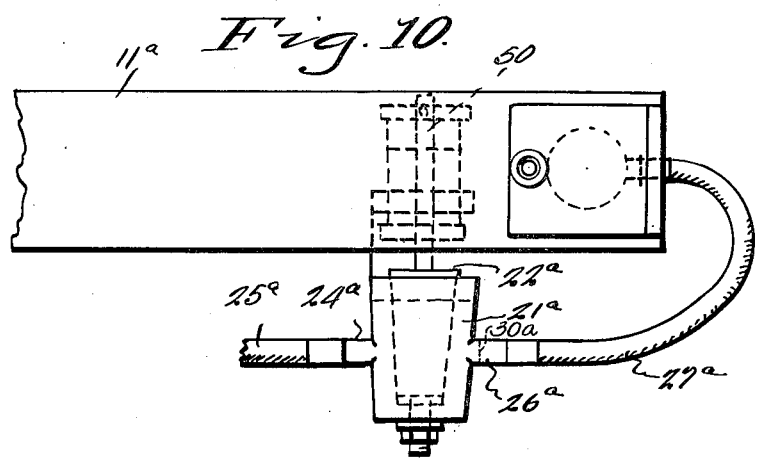
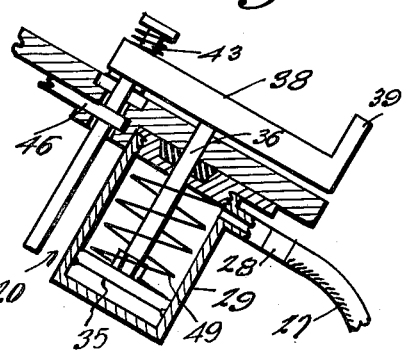
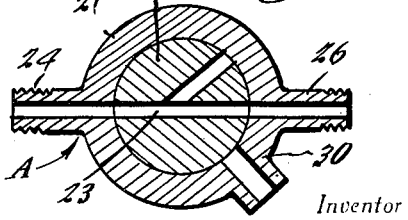
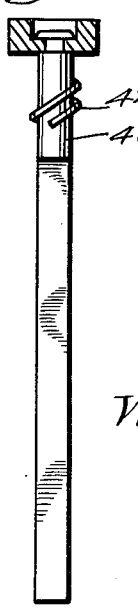
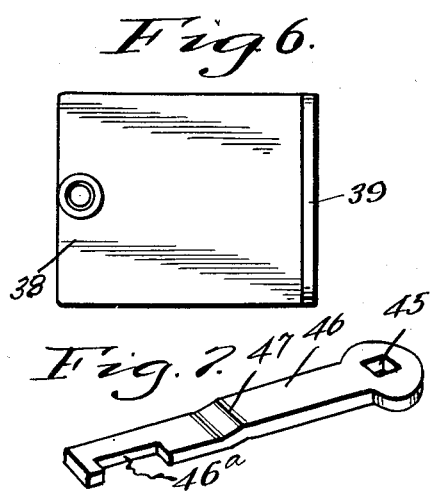
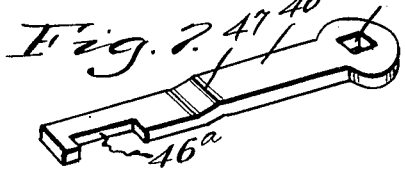

Inventor
William J. Smith
By Clarence A. O'Brien
Hyman Berman
Attorneys

Patented Oct. 17, 1939

2,176,550

UNITED STATES PATENT OFFICE 2,176,550

BRAKE AND ACCELERATOR CONTROL

William J. Smith, Delaware City, Del.

Application October 27, 1937, Serial No. 171,326

18 Claims. (Cl. 192—3)

The present invention appertains to new and useful improvements in motor vehicle controls and more particularly to a single foot controllable member adapted to be actuated for controlling both the accelerator and brakes of a vehicle.

An important object of the invention is to provide a foot pedal for controlling the usual accelerator and brakes of a motor vehicle, wherein the pedal is provided with a heel plate which will assume one position when the pedal is to be used for braking and a more comfortable position when the pedal is to be used for acceleration control.

Another important object of the invention is to provide a foot pedal construction which can be conveniently and comfortably employed for either operating the usual accelerator of a motor vehicle or the brakes thereof.

Various other important objects and advantages of the invention will become apparent to the reader of the following specification.

In the drawings:

Figure 1 represents a side elevational view of the control mounted on a toe board.

Figure 2 is a fragmentary enlarged sectional view through the heel plate and fluid cylinder.

Figure 3 is an enlarged sectional view through the heel plate and fluid cylinder showing the heel plate in depressed position.

Figure 4 is a sectional view taken substantially on the line 4—4 of Figure 1.

Figure 5 is a fragmentary bottom plan view of the pedal.

Figure 6 is a top plan view of the heelplate.

Figure 7 is a perspective view of the latch member.

Figure 8 is a side elevation, partly in section of the latch shaft.

Figure 9 is a sectional view through the valve structure shown in Figure 1.

Figure 10 is a top plan view of a modified form of pedal and valve structure.

Figures 11, 12, 13:
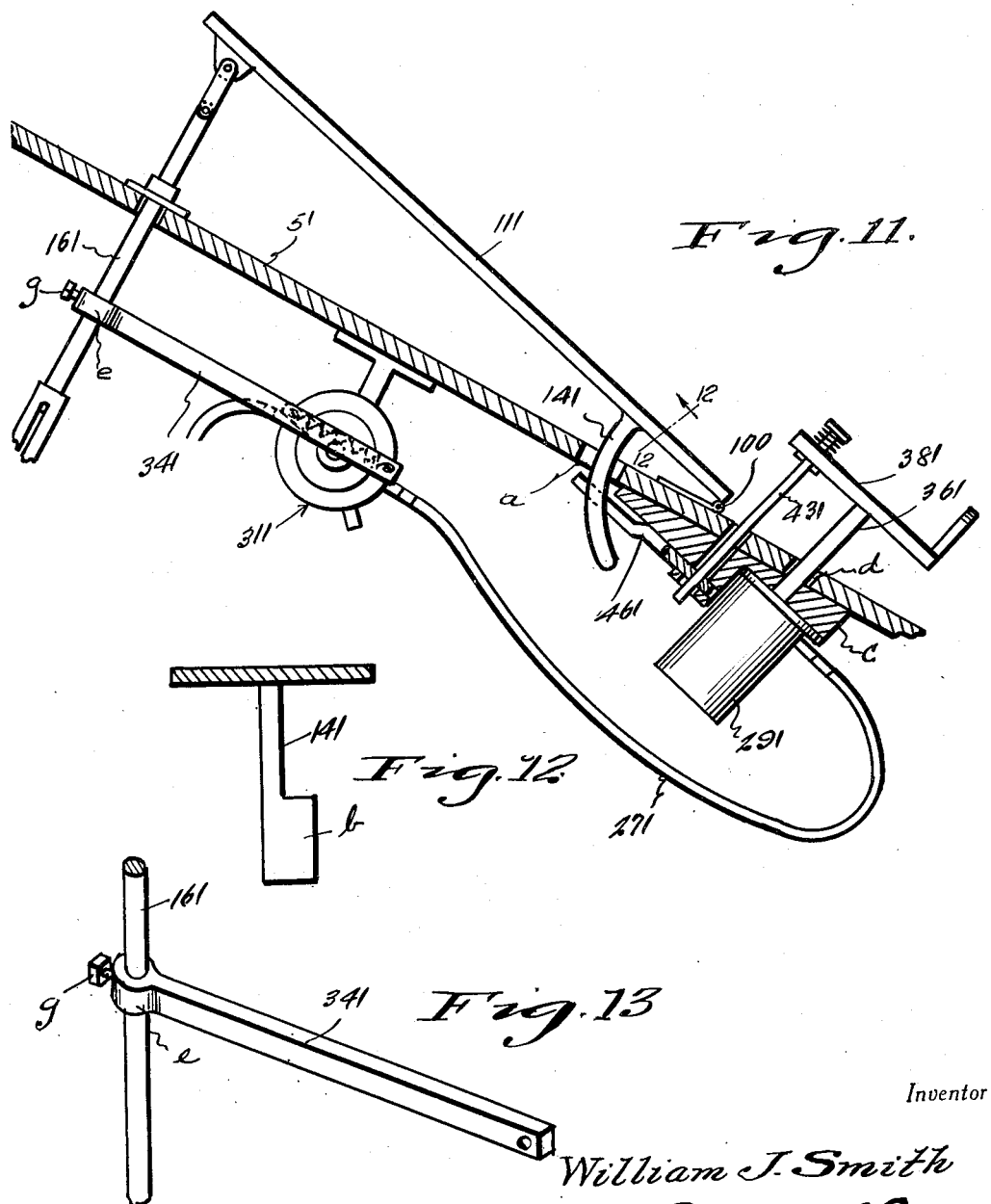
Figure 11 is a side elevational view, partly in section of a third modified form of the invention.
Figure 12 is a cross sectional view taken substantially on the line 12—12 of Figure 11.
Figure 13 is a fragmentary perspective view of the valve operating means.

Referring to the drawings wherein like numerals designate like parts, it can be seen that numeral 5 denotes the usual toe board rising from the floor board 6. Suitably secured to the toe board 5 is the plate 7 from which rises the post 8, the latter having the barrel 9 at its upper end through which the horizontal pin 10 is disposed.

The pedal plate 11 is provided with a pair of depending ears 12—13. The barrel 9 is provided with the upstanding lug 14.

The forward end of the pedal plate 11 has a pivotal link connection 15 to the rod 16 which extends through the toe board guide 17 and through the slotted tube 18 to make proper connection with the brake mechanism of the vehicle. This rod 16 has a pin 19 slidable in the slot of the tube 18 and is adapted to engage the tube 18 at the upper end of the slot to raise the tube, when the forward end of the pedal 11 is raised. The tube 18 is simply connected to the accelerator mechanism of the vehicle (not shown). This latter construction is set forth in my co-pending applications Serial Nos. 141,544; 157,419 and 159,172.

The suction controlling valve A consists of the case 21 and rotor 22, the rotor 22 having the Y-shaped port 23 therein. One end of the port is registrable with the nipple 24 from which the tube 25 extends to the motor, while the remaining ends of the port are registrable with either the nipple 26 which has the tube 27 extending therefrom to the nipple 28 on the cylinder 29, or registrable with both the nipple 26 and the vent 30. The rotor 22 has the shaft extension 31 from which extends the arm 32 and this arm is connected by the coiled extensible spring 33 to the lower end of the elongated arm 34 which extends downwardly from the pin 10, the arm 34 being secured positively to the pin while the pin 10 is positively secured in turn to the ear 12.

In the cylinder 29 is the plunger 35 having the rod 36 extending therefrom through suitable packing means 37 to connect to the underside of the substantially square-shaped heel plate 38 which has a heel abutting flange 39 at its rear end.

The forward portion of the heel plate 38 is provided with the recess 40 therein and extending from the bottom thereof through the plate 38 is the screw-threaded bore 41 for accommodating the screw-threaded portion 42 of the shaft 43. The screw-threaded portion of the shaft is cylindrical in shape while the lower portion is polygonal in shape and extends through the opening 44 in the pedal plate 11 and through the polygonal-shaped opening 45 in the latch plate 46. This latch plate 46 is provided with the offset 47 and has the hook-like formation 46a at its free end for engagement with the lug 14 on the barrel 9.

As can be seen in Figure 1, a spring B connects the rear end portion of the pedal 11 with the post 8 upon which the pedal 11 is rockably mounted, and the tendency of this spring is to rotate the pedal in a clockwise direction. The pedal 11 is rotated counterclockwise to solely operate the brake mechanism connected rod 16, while rotation of the pedal 11 in the opposite direction, that is, in a clockwise direction results in the actuation of the rod 16 in the opposite direction so that the accelerator connected tube 18 is affected. This latter action of the pedal 11 takes place automatically due to the tensioning effect of the spring B, however, the latch member 46 serves to hold the pedal in neutral position as shown in Figure 1 against the tension of the spring and until the latch is released by a depression of the shaft 43, then the operator in holding his foot on the pedal 11 can release the pressure on the forward portion of the pedal to the desired extent, permitting the spring to rotate the pedal in a clockwise direction. Whenever, the forward portion of the pedal is forced downwardly, that is, rotated in a counterclockwise direction to a point below the position shown in Figure 1, that is, below the neutral position the latch will automatically engage the lug 14 and thus hold the pedal against the tendency of the spring B to rotate the pedal to accelerating position.

It will also be observed that when the pedal 11 is rotated in a counterclockwise direction for applying the brakes of the vehicle, the connection rod 34 will operate the valve A so as to connect the suction line 25 from the internal combustion engine directly with the cylinder 29, as shown in Figure 9, for holding the plate 38 in elevated position. However, when the pedal is allowed to rotate in a clockwise direction in response to the tension of the spring B, the valve is operated in the opposite direction for connecting the cylinder 29 with the vent 30 of the valve A, thus permitting air to enter the cylinder 29 and allowing the plunger 25 to be forced downwardly in response to the tension of the spring 49. Thus the heel plate lowers on the pedal 11 when clockwise rotation of the pedal is to be effected.

A second form of the invention is shown in Figure 10, wherein the valve shown in Figure 9 is connected up directly with the shaft 50. In this connection, the shaft to which the ears 12—13 are connected is denoted by numeral 50 and extends laterally of the pedal 11a and carries the plug 22a operating in the case 21a and extending from the case 21a are the nipples 26a and 24a with which the tubes 27a and 25a connect. This case is also provided with a vent 30a corresponding to the vent 30 shown in Figure 9.

A third form of the invention is shown in Figures 11, 12 and 13, it being observed that in this form instead of having the heel plate 381 mounted on the pedal 111, the heel plate 381 is located on the toe board 51. The pedal 111 is hingedly connected as at 100 to the toe board 51 and has the arcuate-shaped keeper 141 extending through the opening a in the toe board 51. The keeper 141 is provided with the head formation b behind which is engageable the swingable latch member 461 which is operated by the slidable screw-threaded member 431 operative through the heel plate 381 in the manner described relative to the form of the invention shown in Figure 1. The cylinder 291 is located under the toe board 51 and is secured to the tapered block c and arising through an opening in this block c and through the opening d in the toe board 51 is the rod 361 which has the plunger (not shown) at its lower end and within the cylinder 291. The upper end of the rod 361, of course, carries the heel plate 381 and the suction tube 271 extends from this cylinder 291 to the control valve generally referred to by the numeral 311. Instead of having this control valve 311 operated by the pedal 111 directly, the valve 311 is spring connected to the arm 341 which arm in turn is provided with the collar formation e at one end for receiving the control rod 161. A set screw g on the collar is feedable inwardly and against the control rod 161 to prevent self-adjusting of the collar e on the said rod.

Thus it can be seen, that while the pedal 111 and the heel plate 381 are independently located, they are in such juxtaposition as to permit convenient operation of either by a single foot.

While the foregoing specification sets forth the invention in specific terms, it is to be understood that numerous changes in the shape, side and materials may be resorted to without departing from the spirit and scope of the invention as claimed hereinafter.

Having described the invention, what is claimed as new is:

1. A heel plate for foot pedals comprising a plate mounted toward the rear of the foot pedal and means maintaining the plate elevated when the foot pedal is raised above a predetermined angle, said means being interconnected between the plate and the pedal.

2. A heel plate for foot pedals comprising a plate mounted toward the rear of the foot pedal and means maintaining the plate elevated when the foot pedal is raised above a predetermined angle, said means being interconnected between the plate and the pedal, and being operative depending upon the position of the foot pedal.

3. A heel plate for foot pedals comprising a plate mounted toward the rear of the foot pedal and means maintaining the plate elevated when the foot pedal is raised above a predetermined angle, said means including a cylinder, a plunger in the cylinder, said heel plate being connected to the plunger and a fluid line extending from the cylinder.

4. A heel plate for foot pedals comprising a plate mounted toward the rear of the foot pedal and means maintaining the plate elevated when the foot pedal is raised above a predetermined angle, said means including a cylinder, a plunger in the cylinder, said heel plate bein connected to the plunger and a fluid line extending from the cylinder, a valve in the said line, and means between the pedal and the valve for operatin the said valve when the pedal is moved through a predetermined angle.

5. A heel plate for combined accelerator and brake control foot pedals and means associated with the heel plate for incidentally controlling the relative position of the heel plate with respect to the foot pedal when pressure is applied to the foot pedal.

6. A heel plate for combined accelerator and brake control foot pedals and means associated with the heel plate for controlling the relative elevational position of the heel plate with respect to the foot pedal, and retainin means for holding the heel plate in elevated position with respect to the foot plate when the foot plate is being moved in one direction.

7. A heel plate for combined accelerator and brake control foot pedals and means associated with the heel plate for controlling the relative position of the heel plate with respect to the foot pedal, and catch means for preventing effective operation of the foot pedal when foot pressure is released therefrom.

8. A heel plate for combined accelerator and brake control foot pedals and means associated with the heel plate for controlling the relative position of the heel plate with respect to the foot pedal, and fluid pressure means for elevating the heel plate when the foot pedal is moved in one direction beyond a neutral position.

9. A combined brake and accelerator control comprising a pedal, means tensionally urging the pedal in one direction, and detent means for holding the pedal position against the tension of said tensioning means, and an elevatable heel plate mounted in association with the foot plate.

10. A combined brake and accelerator control comprising a pedal, means tensionally urging the pedal in one direction, and detent means for holding the pedal position against the tension of said tensioning means, and an elevatable heel plate mounted in association with the foot plate, said detent means including a foot operative member carried by the heel plate.

11. A combined brake and accelerator control comprising a pedal, means tensionally urging the pedal in one direction, and detent means for holding the pedal position against the tension of said tensioning means, and an elevatable heel plate mounted toward one end portion of the foot pedal.

12. A combined brake and accelerator control comprising a pedal, means tensionally urging the pedal in one direction, and detent means for holding the pedal position against the tension of said tensioning means, and an elevatable heel mounted toward one end portion of the foot pedal, said means holding the plate in elevated position when the plate is actuated in a direction against the tension of the tensioning means.

13. A combined brake and accelerator control comprising a pedal, means tensionally urging the pedal in one direction, and detent means for holding the pedal position against the tension of said tensioning means, and an elevatable heel plate mounted toward one end of the foot pedal, said elevatable heel plate being mounted toward the rear end of the pedal, and means holding the heel plate in elevated position when the pedal is actuated in a brake operating forwardly direction.

14. A combined brake and accelerator control comprising a pedal, means tensionally urging the pedal in one direction, and detent means for holding the pedal position against the tension of said tensioning means, and an elevatable heel plate mounted toward one end of the foot pedal, said elevatable heel plate being mounted toward the rear end of the pedal, and means holding the heel plate in elevated position when the pedal is actuated in a brake operating forwardly direction, said holding means including a cylinder, a piston operative in the cylinder, a connection between the piston and the heel plate, and a fluid line connected with the cylinder and controlled by said pedal.

15. A combined brake and accelerator control comprising a pedal, means tensionally urging the pedal in one direction, and detent means for holding the pedal position against the tension of said tensioning means, and an elevatable heel plate mounted toward one end of the foot pedal, said elevatable heel plate being mounted toward the rear end of the pedal, and means holding the heel plate in elevated position when the pedal is actuated in a brake operating forwardly direction, said holding means including a suction line, suction responsive means associated with the plate for holding the plate elevated, and valve means in the line and operatively connected with the foot pedal for opening the line to the suction responsive means when the pedal is moved in a forwardly direction.

16. A heel plate for a combined accelerator and brake control foot pedal, means associated with the heel plate for controlling the relative position of the heel plate with respect to the foot pedal, and catch means for preventing effective operation of the foot pedal when the foot pressure is released therefrom, said catch means being in the form of a depressible member carried by the heel plate and including a latch member effectively associated with the foot pedal and operatively connected with the depressible member.

17. A heel plate for a combined accelerator and brake control foot pedal, means associated with the heel plate for controlling the relative position of the heel plate with respect to the foot pedal, and catch means for preventing effective operation of the foot pedal when the foot pressure is released therefrom, said catch means being in the form of a depressible member carried by the heel plate and including a latch member effectively associated with the foot pedal and operatively connected with the depressible member and a screw carried by the depressible member and operatively connected with the said heel plate.

18. A heel plate for a combined accelerator and brake control foot pedal, means associated with the heel plate for controlling the relative position of the heel plate with respect to the foot pedal, and catch means for preventing effective operation of the foot pedal when the foot pressure is released therefrom, said catch means being in the form of a depressible member carried by the heel plate and including a latch member effectively associated with the foot pedal and operatively connected with the depressible member and a screw carried by the depressible member and operatively connected with the said heel plate and spring means for rotating and returning the screw member to normal position.

WILLIAM J. SMITH.